US010208155B2

(12) United States Patent
Sworen et al.

(10) Patent No.: US 10,208,155 B2
(45) Date of Patent: Feb. 19, 2019

(54) SULFONATED FLUORINATED, NON-FLUORINATED OR PARTIALLY FLUORINATED URETHANES

(71) Applicant: THE CHEMOURS COMPANY FC LLC, Wilmington, DE (US)

(72) Inventors: John Christopher Sworen, Chadds Ford, PA (US); Gerald Oronde Brown, Wilmington, DE (US); Tatsiana Haidzinskaya, Newark, DE (US)

(73) Assignee: THE CHEMOURS COMPANY FC, LLC, Wilmington, DE (US)

( * ) Notice: Subject to any disclaimer, the term of this patent is extended or adjusted under 35 U.S.C. 154(b) by 290 days.

(21) Appl. No.: 14/863,830

(22) Filed: Sep. 24, 2015

(65) Prior Publication Data
US 2016/0090438 A1 Mar. 31, 2016

Related U.S. Application Data

(60) Provisional application No. 62/055,953, filed on Sep. 26, 2014.

(51) Int. Cl.
C08G 18/73 (2006.01)
C08G 18/36 (2006.01)
C09D 175/04 (2006.01)
C08G 18/28 (2006.01)
C08G 18/22 (2006.01)
C08G 18/08 (2006.01)
C08G 18/83 (2006.01)
C08G 18/79 (2006.01)
D06M 15/21 (2006.01)
D06M 15/564 (2006.01)
D06M 15/576 (2006.01)
C09D 175/08 (2006.01)
C08G 18/48 (2006.01)
D06M 15/19 (2006.01)
C08G 18/34 (2006.01)

(52) U.S. Cl.
CPC ......... C08G 18/73 (2013.01); C08G 18/0828 (2013.01); C08G 18/222 (2013.01); C08G 18/225 (2013.01); C08G 18/284 (2013.01); C08G 18/2885 (2013.01); C08G 18/345 (2013.01); C08G 18/36 (2013.01); C08G 18/4833 (2013.01); C08G 18/792 (2013.01); C08G 18/83 (2013.01); C09D 175/04 (2013.01); C09D 175/08 (2013.01); D06M 15/195 (2013.01); D06M 15/21 (2013.01); D06M 15/564 (2013.01); D06M 15/576 (2013.01); C08G 2150/00 (2013.01); D06M 2200/01 (2013.01)

(58) Field of Classification Search
None
See application file for complete search history.

(56) References Cited

U.S. PATENT DOCUMENTS

| 3,049,513 A | 8/1962 | Damusis |
| 3,505,001 A | 4/1970 | Wagner |
| 3,872,058 A | 3/1975 | Gresham |
| 4,056,564 A * | 11/1977 | Wolf ............. C07C 309/00 528/294 |
| 4,108,814 A * | 8/1978 | Reiff ............. C08G 18/0828 524/840 |
| 4,297,290 A | 10/1981 | Stockburger |
| 4,304,683 A | 12/1981 | Morinaka et al. |
| 4,360,447 A | 11/1982 | Morinaka et al. |
| 5,117,041 A | 5/1992 | McBride |
| 6,313,335 B1 | 11/2001 | Roberts et al. |
| 6,864,312 B2 | 3/2005 | Moore |
| 7,344,758 B2 | 3/2008 | Franchina et al. |
| 8,349,986 B2 | 1/2013 | Rukavina et al. |
| 8,586,697 B2 | 11/2013 | Elizalde et al. |
| 2003/0120101 A1 | 6/2003 | Lai |
| 2005/0085573 A1 | 4/2005 | Sandner et al. |
| 2005/0090169 A1* | 4/2005 | Mimura ............. C08G 18/10 442/104 |
| 2006/0052556 A1 | 3/2006 | Franchina et al. |
| 2006/0151739 A1 | 7/2006 | Sandner et al. |
| 2007/0009663 A1 | 1/2007 | Wang et al. |
| 2007/0167601 A1 | 7/2007 | Rukavina et al. |
| 2007/0244289 A1 | 10/2007 | Audenaert et al. |

(Continued)

FOREIGN PATENT DOCUMENTS

CN 101914185 A 12/2010
DE 4415451 A1 * 11/1995 ......... C08G 18/0804

(Continued)

OTHER PUBLICATIONS

Machine translation of EP 0703255 A1, retrieved Oct. 2017. (Year: 2017).*

(Continued)

Primary Examiner — Nicole M. Buie-Hatcher

(57) ABSTRACT

The invention relates to a compound prepared by (i) reacting (a) at least one compound selected from diisocyanate, polyisocyanate, or mixture thereof; (b) at least one isocyanate-reactive compound selected from a fluorinated alcohol; a cyclic or acyclic sugar alcohol which is substituted with at least one —$R^1$, —$C(O)R^1$, —$(CH_2CH_2O)_n(CH(CH_3)CH_2O)_mR^2$, —$(CH_2CH_2O)_n(CH(CH_3)CH_2O)_mC(O)R^1$, or mixtures thereof; or mixtures of a fluorinated alcohol and a substituted cyclic or acyclic sugar alcohol; and (c) at least one isocyanate-reactive ethylenically unsaturated compound; wherein each n is independently 0 to 20; each m is independently 0 to 20; m+n is greater than 0; each $R^1$ is independently a linear or branched alkyl group having 5 to 29 carbons optionally comprising at least 1 unsaturated bond; each $R^2$ is independently —H, or a linear or branched alkyl group having 6 to 30 carbons optionally comprising at least 1 unsaturated bond, or mixtures thereof; and (ii) reacting the reaction product of step (i) with a bisulfate source.

13 Claims, No Drawings

(56) References Cited

U.S. PATENT DOCUMENTS

| | | |
|---|---|---|
| 2008/0146750 A1 | 6/2008 | Corn et al. |
| 2008/0196168 A1* | 8/2008 | Schubert ............ C08G 18/0823 8/94.21 |
| 2010/0124649 A1 | 5/2010 | Rukavina et al. |
| 2010/0190397 A1 | 7/2010 | Duschek et al. |
| 2013/0288066 A1 | 10/2013 | Reiners et al. |
| 2014/0031483 A1 | 1/2014 | Elizalde et al. |
| 2014/0295724 A1 | 10/2014 | Sworen et al. |

FOREIGN PATENT DOCUMENTS

| | | | |
|---|---|---|---|
| EP | 0327280 | 8/1988 | |
| EP | 0357280 | 3/1990 | |
| EP | 0703255 A1 * | 3/1996 | ......... C08G 18/5072 |
| EP | 2415879 | 8/2010 | |
| GB | 887387 | 1/1962 | |
| GB | 1360007 | 7/1974 | |
| GB | 1483859 A * | 8/1977 | ......... C08G 18/0828 |
| JP | 47003477 B | 1/1972 | |
| JP | 49-93597 | 1/1973 | |
| JP | 58-79008 | 5/1983 | |
| JP | 1985045678 B2 | 10/1985 | |
| JP | 05331130 A | 12/1993 | |
| KR | 2009002894 A1 | 1/2009 | |
| WO | 199301349 | 1/1993 | |
| WO | 200037525 A1 | 6/2000 | |
| WO | 2003089477 A1 | 10/2003 | |
| WO | 2006024669 A1 | 3/2006 | |
| WO | 200640333 A1 | 4/2006 | |
| WO | 2009015136 A1 | 1/2009 | |
| WO | 2011124710 A | 10/2011 | |

OTHER PUBLICATIONS

Machine translation of DE 4415451 A1, retrieved Oct. 2017. (Year: 2017).*

International Search Report and Written Opinion of PCT/US2015/051880, dated Dec. 7, 2015.

Mao et al., Effect of additives on microstructure and properties of polyurethane coating film for fabrics, Fangzhi Xuebao (1996), 17(2), 4-7 (Abstract attached).

Tarun K. Paul, Umashankar Sathpathy and Ranajit S. Konar, "Sodium Methabisulphite Initiated Aqueous Polymerisation of Methyl Methacrylate" The British Polymer Journal (Sep. 1982):105-112.

* cited by examiner

SULFONATED FLUORINATED, NON-FLUORINATED OR PARTIALLY FLUORINATED URETHANES

FIELD OF INVENTION

This invention relates to a sulfonated urethane composition comprising the reaction product of a bisulfate source with a fluorinated, non-fluorinated, or partially fluorinated urethane compound.

BACKGROUND OF THE INVENTION

Various compositions are known to be useful as treating agents to provide water repellency or stain release to textile substrates. Many such treating agents are fluorinated polymers and copolymers, or non-fluorinated polymers and copolymers. Non-fluorinated compounds are predominately polyacrylate-based or urethane-based copolymers.

Fluorinated and non-fluorinated surfactants are known to be useful as additives to aqueous systems including architectural coatings for reducing surface tension and/or providing cleanability.

Fluorinated copolymers provide good repellency to water and oil. Various attempts have been made to produce a non-fluorinated water repellent. Non-fluorinated copolymers are known to provide water repellency and optionally stain release to textiles, but are less effective than the fluorinated counterparts.

McBride, in U.S. Pat. No. 5,117,041, discloses sulfonated allyl end-capped propylene terephthalate polyester oligomers useful for forming soil release agents for ethylene terephthalate fibers and fabrics.

SUMMARY OF INVENTION

The need exists for compounds with improved stain release or surfactant properties in the textile and coatings markets. The present invention meets these needs.

The present invention relates to a compound comprising the reaction product of reagents comprising: (a) at least one isocyanate group-containing compound selected from diisocyanate, polyisocyanate, or mixture thereof; (b) at least one isocyanate-reactive compound selected from the group consisting of a fluorinated alcohol; a cyclic or acyclic sugar alcohol which is substituted with at least one —$R^1$, —C(O)$R^1$, —$(CH_2CH_2O)_n(CH(CH_3)CH_2O)_mR^2$, —$(CH_2CH_2O)_n(CH(CH_3)CH_2O)_mC(O)R^1$, or mixtures thereof; and mixtures of a fluorinated alcohol and the a cyclic or acyclic sugar alcohol which is substituted with at least one —$R^1$, —C(O)$R^1$, —$(CH_2CH_2O)_n(CH(CH_3)CH_2O)_mR^2$, —$(CH_2CH_2O)_n(CH(CH_3)CH_2O)_mC(O)R^1$, or mixtures thereof; where the cyclic or acyclic sugar alcohol is selected from a saccharide, reduced sugar, aminosaccharide, aldonic acid, or aldonic acid lactone; wherein each n is independently 0 to 20; each m is independently 0 to 20; m+n is greater than 0; each $R^1$ is independently a linear or branched alkyl group having 5 to 29 carbons optionally comprising at least 1 unsaturated bond; each $R^2$ is independently —H, or a linear or branched alkyl group having 6 to 30 carbons optionally comprising at least 1 unsaturated bond, or mixtures thereof; (c) at least one isocyanate-reactive ethylenically unsaturated compound; and (d) a bisulfate source.

In another embodiment, the invention relates to a method of preparing a compound comprising: (i) reacting (a) at least one isocyanate group-containing compound selected from diisocyanate, polyisocyanate, or mixture thereof; (b) at least one isocyanate-reactive compound selected from the group consisting of a fluorinated alcohol; a cyclic or acyclic sugar alcohol which is substituted with at least one —$R^1$, —C(O)$R^1$, —$(CH_2CH_2O)_n(CH(CH_3)CH_2O)_mR^2$, —$(CH_2CH_2O)_n(CH(CH_3)CH_2O)_mC(O)R^1$, or mixtures thereof; and mixtures of a fluorinated alcohol and a cyclic or acyclic sugar alcohol which is substituted with at least one —$R^1$, —C(O)$R^1$, —$(CH_2CH_2O)_n(CH(CH_3)CH_2O)_mR^2$, —$(CH_2CH_2O)_n(CH(CH_3)CH_2O)_mC(O)R^1$, or mixtures thereof; and (c) at least one isocyanate-reactive ethylenically unsaturated compound; where the cyclic or acyclic sugar alcohol is selected from a saccharide, reduced sugar, aminosaccharide, aldonic acid, or aldonic acid lactone; wherein each n is independently 0 to 20; each m is independently 0 to 20; m+n is greater than 0; each $R^1$ is independently a linear or branched alkyl group having 5 to 29 carbons optionally comprising at least 1 unsaturated bond; each $R^2$ is independently —H, or a linear or branched alkyl group having 6 to 30 carbons optionally comprising at least 1 unsaturated bond, or mixtures thereof; and (ii) reacting the reaction product of step (i) with (d) a bisulfate source in the presence of a radical initiator.

In a third embodiment, the present invention is a method of reducing the surface tension of an aqueous medium comprising contacting the aqueous medium with a compound comprising the reaction product of reagents comprising: (a) at least one isocyanate group-containing compound selected from diisocyanate, polyisocyanate, or mixture thereof; (b) at least one isocyanate-reactive compound selected from the group consisting of a fluorinated alcohol; a cyclic or acyclic sugar alcohol which is substituted with at least one —$R^1$, —C(O)$R^1$, —$(CH_2CH_2O)_n(CH(CH_3)CH_2O)_mR^2$, —$(CH_2CH_2O)_n(CH(CH_3)CH_2O)_mC(O)R^1$, or mixtures thereof; and mixtures of a fluorinated alcohol and a cyclic or acyclic sugar alcohol which is substituted with at least one —$R^1$, —C(O)$R^1$, —$(CH_2CH_2O)_n(CH(CH_3)CH_2O)_mR^2$, —$(CH_2CH_2O)_n(CH(CH_3)CH_2O)_mC(O)R^1$, or mixtures thereof; where the cyclic or acyclic sugar alcohol is selected from a saccharide, reduced sugar, aminosaccharide, aldonic acid, or aldonic acid lactone; wherein each n is independently 0 to 20; each m is independently 0 to 20; m+n is greater than 0; each $R^1$ is independently a linear or branched alkyl group having 5 to 29 carbons optionally comprising at least 1 unsaturated bond; each $R^2$ is independently —H, or a linear or branched alkyl group having 6 to 30 carbons optionally comprising at least 1 unsaturated bond, or mixtures thereof; (c) at least one isocyanate-reactive ethylenically unsaturated compound; and (d) a bisulfate source.

The invention also relates to a method of providing a surface effect to a fibrous substrate comprising contacting a fibrous substrate with a compound comprising the reaction product of reagents comprising: (a) at least one isocyanate group-containing compound selected from diisocyanate, polyisocyanate, or mixture thereof; (b) at least one isocyanate-reactive compound selected from the group consisting of a fluorinated alcohol; a cyclic or acyclic sugar alcohol which is substituted with at least one —$R^1$, —C(O)$R^1$, —$(CH_2CH_2O)_n(CH(CH_3)CH_2O)_mR^2$, —$(CH_2CH_2O)_n(CH(CH_3)CH_2O)_mC(O)R^1$, or mixtures thereof; and mixtures of a fluorinated alcohol and a cyclic or acyclic sugar alcohol which is substituted with at least one —$R^1$, —C(O)$R^1$, —$(CH_2CH_2O)_n(CH(CH_3)CH_2O)_mR^2$, —$(CH_2CH_2O)_n(CH(CH_3)CH_2O)_mC(O)R^1$, or mixtures thereof; where the cyclic or acyclic sugar alcohol is selected from a saccharide, reduced sugar, aminosaccharide, aldonic acid, or aldonic acid lactone; wherein each n is independently 0 to 20; each m is independently 0 to 20; m+n is greater than 0; each $R^1$ is independently a linear or branched alkyl group having 5 to 29 carbons optionally comprising at least 1 unsaturated bond; each $R^2$ is independently —H, or a linear or branched alkyl group having 6 to 30 carbons optionally comprising at least 1 unsaturated bond, or mixtures thereof; (c) at least one isocyanate-reactive ethylenically unsaturated compound; and (d) a bisulfate source.

DETAILED DESCRIPTION OF INVENTION

Herein all trademarks are designated with capital letters.

The present invention relates to a compound comprising the reaction product of reagents comprising: (a) at least one isocyanate group-containing compound selected from diisocyanate, polyisocyanate, or mixture thereof; (b) at least one isocyanate-reactive compound selected from the group consisting of a fluorinated alcohol; a cyclic or acyclic sugar alcohol which is substituted with at least one —$R^1$, —C(O)$R^1$, —(CH$_2$CH$_2$O)$_n$(CH(CH$_3$)CH$_2$O)$_m$$R^2$, —(CH$_2$CH$_2$O)$_n$(CH(CH$_3$)CH$_2$O)$_m$C(O)$R^1$, or mixtures thereof; and mixtures of a fluorinated alcohol and a cyclic or acyclic sugar alcohol which is substituted with at least one —$R^1$, —C(O)$R^1$, —(CH$_2$CH$_2$O)$_n$(CH(CH$_3$)CH$_2$O)$_m$$R^2$, —(CH$_2$CH$_2$O)$_n$(CH(CH$_3$)CH$_2$O)$_m$C(O)$R^1$, or mixtures thereof; where the cyclic or acyclic sugar alcohol is selected from a saccharide, reduced sugar, aminosaccharide, aldonic acid, or aldonic acid lactone; wherein each n is independently 0 to 20; each m is independently 0 to 20; m+n is greater than 0; each $R^1$ is independently a linear or branched alkyl group having 5 to 29 carbons optionally comprising at least 1 unsaturated bond; each $R^2$ is independently —H, or a linear or branched alkyl group having 6 to 30 carbons optionally comprising at least 1 unsaturated bond, or mixtures thereof; (c) at least one isocyanate-reactive ethylenically unsaturated compound; and (d) a bisulfate source.

Fluorinated alcohols may be used to improve stain release properties of the end product. Any suitable fluorinated alcohol may be used. In one embodiment, the isocyanate-reactive compound (b) is a fluorinated alcohol having Formula (I)

where $R_f$ is a $C_1$ to $C_{20}$ perfluoroalkyl group optionally interrupted by CH$_2$, CH$_2$CH$_2$, SO$_2$N, CFH, S, or O; and A is a direct bond or a $C_1$ to $C_6$ alkylene group. $R_f$ and A may be linear or branched. In one aspect, the fluorinated alcohol is a telomer-based alcohol, where $R_f$ is a linear perfluoroalkyl group and A is CH$_2$CH$_2$. In one aspect, $R_f$ is a $C_2$ to $C_6$ linear or branched perfluoroalkyl group. Specific examples of fluorinated alcohols include but are not limited to $R_f$OH, $R_f$CH$_2$CH$_2$OH, $R_f$SO$_2$NHCH$_2$CH$_2$OH, $R_f$CH$_2$CH$_2$SCH$_2$CH$_2$OH, $R_f$CH$_2$CH$_2$CF$_2$CF$_2$CH$_2$CH$_2$OH, $R_f$CH$_2$CH$_2$(CF$_2$CF$_2$CH$_2$CH$_2$)$_2$OH, $R_f$CH$_2$CF$_2$CH$_2$CH$_2$OH, $R_f$CH$_2$CF$_2$CH$_2$CF$_2$CH$_2$CH$_2$OH, $R_f$OCF$_2$CF$_2$CH$_2$CH$_2$OH, $R_f$CH$_2$OCH$_2$CH$_2$OH, $R_f$CHFCH$_2$CH$_2$OH, $R_f$CH$_2$O(CH$_2$)$_6$OH, (CF$_3$)$_2$CFCH$_2$CH$_2$OH, (CF$_3$)$_2$CFCH$_2$CH$_2$CH$_2$OH, $R_f$CH$_2$CH$_2$SO$_2$NHCH$_2$CH$_2$OH, $R_f$CH$_2$CH$_2$SO$_2$N(CH$_3$)CH$_2$CH$_2$OH, $R_f$CH$_2$CH$_2$SO$_2$N(CH$_2$CH$_3$)CH$_2$CH$_2$OH, R—(CF(CF$_3$)CF$_{20}$)$_y$CH$_2$OH, CF$_2$=CFOCF$_2$CF(CF$_3$)OCF$_2$CF$_2$CH$_2$OH, or $R_f$CH$_2$OC$_2$F$_4$CH$_2$OCH$_2$CH$_2$OH.

In another embodiment, the isocyanate-reactive compound (b) is a cyclic or acyclic sugar alcohol which is substituted with at least one —$R^1$, —C(O)$R^1$, —(CH$_2$CH$_2$O)$_n$(CH(CH$_3$)CH$_2$O)$_m$$R^2$, —(CH$_2$CH$_2$O)$_n$(CH(CH$_3$)CH$_2$O)$_m$C(O)$R^1$, or mixtures thereof. The reaction of the substituted sugar alcohol with the isocyanate component will yield a urethane linkage with residues of the substituted sugar alcohol and of the isocyanate. The term "residue of a cyclic or acyclic sugar alcohol" is herein defined as the molecular structure of a cyclic or acyclic sugar alcohol when one or more H atoms has been removed from a hydroxyl group —OH. The urethane functional group may be formed by any suitable method, including by reacting a diisocyanate or polyisocyanate with a cyclic or acyclic sugar alcohol which is substituted with at least one —$R^1$; —C(O)$R^1$; —(CH$_2$CH$_2$O)$_n$(CH(CH$_3$)CH$_2$O)$_m$$R^2$; —(CH$_2$CH$_2$O)$_n$(CH(CH$_3$)CHO)$_m$C(O)$R^1$; or mixtures thereof. The term "residue of an isocyanate, diisocyanate, or polyisocyanate" is herein defined as the molecular structure of an isocyanate, diisocyanate, or polyisocyanate where all isocyanate groups NCO have been removed.

The cyclic or acyclic sugar alcohol is selected from a saccharide, reduced sugar, aminosaccharide, aldonic acid, or aldonic acid lactone, and is substituted with at least one —$R^1$; —C(O)$R^1$; —(CH$_2$CH$_2$O)$_n$(CH(CH$_3$)CH$_2$O)$_m$$R^2$; —(CH$_2$CH$_2$O)$_n$(CH(CH$_3$)CH$_2$O)$_m$C(O)$R^1$; or mixtures thereof. Such a substitution lends hydrophobic character to the monomer, and to the polymer molecules. In one embodiment, the cyclic or acyclic sugar alcohol is substituted with at least two —$R^1$; —C(O)$R^1$; —(CH$_2$CH$_2$O)$_n$(CH(CH$_3$)CH$_2$O)$_m$$R^2$; —(CH$_2$CH$_2$O)$_n$(CH(CH$_3$)CH$_2$O)$_m$C(O)$R^1$; or mixtures thereof; and in another embodiment, it is substituted with at least three —$R^1$; —C(O)$R^1$; —(CH$_2$CH$_2$O)$_n$(CH(CH$_3$)CH$_2$O)$_m$$R^2$; —(CH$_2$CH$_2$O)$_n$(CH(CH$_3$)CH$_2$O)$_m$C(O)$R^1$; or mixtures thereof. The substituted sugar alcohols may be formed by reacting (b') at least one sugar alcohol with (b") at least one fatty acid or alkoxylated fatty acid. This step can be performed by any suitable esterification process. For example, U.S. Pat. No. 4,297,290 describes the synthesis of sorbitan esters, where an anhydro sorbitol is reacted with a fatty acid in the presence of an alkaline catalyst. Examples of such sugar alcohols (b') include but are not limited to aldoses and ketoses such as those compounds derived from tetroses, pentoses, hexoses, and heptoses. Specific examples include glucose, glyceraldehyde, erythrose, arabinose, ribose, arabinose, allose, altrose, mannose, xylose, lyxose, gulose, glactose, talose, fructose, ribulose, mannoheptulose, sedohelptulose, threose, erythritol, threitol, glucopyranose, mannopyranose, talopyranose, allopyranose, altropyranose, idopyranose, gulopyranose, glucitol, mannitol, erythritol, sorbitol, arabitol, xylitol, ribitol, galactitol, fucitol, iditol, inositol, pentaerythritol, dipentaerythritol, volemitol, gluconic acid, glyceric acid, xylonic acid, galactaric acid, ascorbic acid, citric acid, gluconic acid lactone, glyceric acid lactone, xylonic acid lactone, glucosamine, galactosamine, or mixtures thereof.

The cyclic or acyclic sugar alcohols used in this invention are substituted with at least one —$R^1$; —C(O)$R^1$; —(CH$_2$CH$_2$O)$_n$(CH(CH$_3$)CH$_2$O)$_m$$R^2$; or —(CH$_2$CH$_2$O)$_n$(CH(CH$_3$)CH$_2$O)$_m$C(O)$R^1$ by any suitable method, including esterification with a fatty acid, to form hydroxy-functional substituted sugar alcohols. In one embodiment, the fatty acid substitution of the cyclic or acyclic sugar alcohols has a melting point of at least −59° C. In another embodiment, the fatty acid substitution of the cyclic or acyclic sugar alcohols has a melting point of at least 0° C., and in a third embodiment, the fatty acid substitution of the cyclic or acyclic sugar alcohols has a melting point of at least 40° C. Suitable fatty acids (b") include, but are not limited to, caprylic acid, capric acid, lauric acid, mysteric acid, palmitic acid, stearic acid, arachidic acid, behenic acid, lignoceric acid, palmitoleic acid, lineolic acid, oleic acid, erucic acid, and mixtures thereof. In one embodiment, $R^1$ is a linear or branched alkyl group having 7 to 29 carbons, in another embodiment, $R^1$ is a linear or branched alkyl group having 9 to 29 carbons, and in another embodiment, $R^1$ is a linear or branched alkyl group having 11 to 21 carbons. In one embodiment, $R^2$ is a linear or branched alkyl group having 8 to 30 carbons, in another embodiment, $R^2$ is a linear or branched alkyl group having 10 to 30 carbons, and in another embodiment, $R^2$ is a linear or branched alkyl group having 12 to 22 carbons.

In one embodiment, the isocyanate-reactive compound (b) is selected from Formulas (IIa), (IIIb), or (IIc):

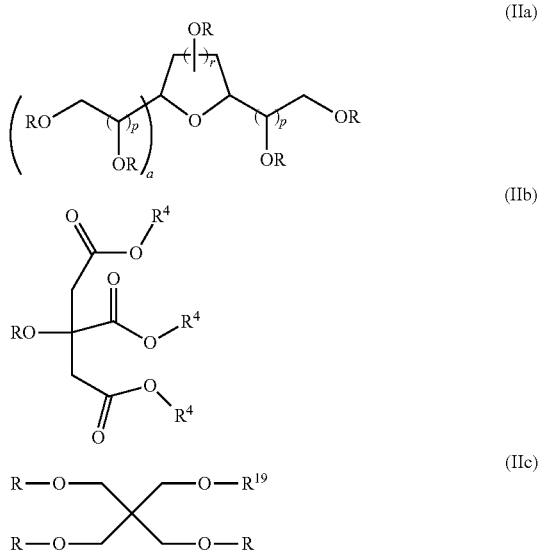

wherein each R is independently —H; —$R^1$; —C(O)$R^1$; —(CH$_2$CH$_2$O)$_n$(CH(CH$_3$)CH$_2$O)$_m$$R^2$; or —(CH$_2$CH$_2$O)$_n$(CH(CH$_3$)CH$_2$O)$_m$C(O)$R^1$; each n is independently 0 to 20; each m is independently 0 to 20; m+n is greater than 0; r is 1 to 3; a is 0 or 1; p is independently 0 to 2; provided that a is 0 when r is 3; each $R^1$ is independently a linear or branched alkyl group having 5 to 29 carbons optionally comprising at least 1 unsaturated bond; each $R^2$ is independently —H, or a linear or branched alkyl group having 6 to 30 carbons optionally comprising at least 1 unsaturated bond; or mixtures thereof, provided when Formula (IIa) is chosen, then at least one R is —H and at least one R is a —$R^1$; —C(O)$R^1$; —(CH$_2$CH$_2$O)$_n$(CH(CH$_3$)CH$_2$O)$_m$$R^2$; or —(CH$_2$CH$_2$O)$_n$(CH(CH$_3$)CH$_2$O)$_m$C(O)$R^1$; each $R^4$ is independently —H, a linear or branched alkyl group having 6 to 30 carbons optionally comprising at least 1 unsaturated bond, or combinations thereof; —(CH$_2$CH$_2$O)$_n$(CH(CH$_3$)CH$_2$O)$_m$$R^2$; or —(CH$_2$CH$_2$O)$_n$(CH(CH$_3$)CH$_2$O)$_m$C(O)$R^1$; provided when Formula (IIb) is chosen, then at least one R or $R^4$ is —H; and at least one R or $R^4$ is a linear or branched alkyl optionally comprising at least 1 unsaturated bond, or combinations thereof; —(CH$_2$CH$_2$O)$_n$(CH(CH$_3$)CH$_2$O)$_m$$R^2$; or —(CH$_2$CH$_2$O)$_n$(CH(CH$_3$)CH$_2$O)$_m$C(O)$R^1$; and each $R^{19}$ is —H, —C(O)$R^1$, or —CH$_2$C[CH$_2$OR]$_3$, provided when Formula (IIc) is chosen, then at least one $R^{19}$ or R is —H; and at least one $R^{19}$ or R is —C(O)$R^1$, —(CH$_2$CH$_2$O)$_n$(CH(CH$_3$)CH$_2$O)$_m$$R^2$; or —(CH$_2$CH$_2$O)$_n$(CH(CH$_3$)CH$_2$O)$_m$C(O)$R^1$. In Formulas (IIa), (IIIb), or (IIc), the —(CH$_2$CH$_2$O)— represents oxyethylene groups (EO) and —(CH(CH$_3$)CH$_2$O)— represents oxypropylene groups (PO). These compounds can contain only EO groups, only PO groups, or mixtures thereof. These compounds can also be present as a tri-block copolymer designated PEG-PPG-PEG (polyethylene glycol-polypropylene glycol-polyethylene glycol), for example.

Where the isocyanate-reactive compound (b) is from Formula (IIa), any suitable substituted reduced sugar alcohol may be employed, including esters of 1,4-sorbitan, esters of 2,5-sorbitan, and esters of 3,6-sorbitan. In one embodiment, the isocyanate-reactive compound (b) is selected from Formula (IIa) to be Formula (IIa'):

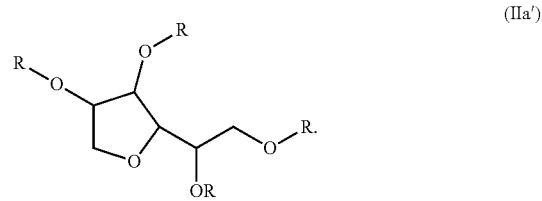

In one embodiment, at least one R is H, and at least one R is —C(O)$R^1$ or $R^1$. Compounds used to form residues of Formula (IIa'), having at least one R as —H and at least one R selected from —C(O)$R^1$, are commonly known as alkyl sorbitans. These sorbitans can be mono-substituted, di-substituted, or tri-substituted with —C(O)$R^1$. It is known that commercially available sorbitans, such as SPAN, contain a mixture of the various sorbitans ranging from where each R is H (un-substituted), and sorbitans where each R is —C(O)$R^1$ (fully substituted); wherein $R^1$ is a linear or branched alkyl group having 5 to 29 carbons; and mixtures of various substitutions thereof. The commercially available sorbitans may also include amounts of sorbitol, isosorbide, or other intermediates or byproducts.

In one embodiment, at least one R is —C(O)$R^1$, and $R^1$ is a linear or branched alkyl group having 5 to 29 carbons. In another embodiment, $R^1$ is a linear or branched alkyl group having 7 to 21 carbons, and in a third embodiment, $R^1$ is a linear or branched alkyl group having 11 to 21 carbons. Preferred compounds used to form these residues include mono-, di-, and tri-substituted sorbitans derived from caprylic acid, capric acid, lauric acid, mysteric acid, palmitic acid, stearic acid, arachidic acid, behenic acid, lignoceric acid, and mixtures thereof. Particularly preferred compounds include mono-, di-, and tri-substituted sorbitan stearates or sorbitan behenins.

Optionally, $R^1$ is a linear or branched alkyl group having 5 to 29 carbons comprising at least 1 unsaturated bond. Examples of compounds used to form residues of Formula (IIa') wherein at least one R is selected from —C(O)$R^1$; and $R^1$ contains least 1 unsaturated bond, include, but are not limited to, sorbitan trioleate (i.e., wherein $R^1$ is —C$_7$H$_{14}$CH=CHC$_8$H$_{17}$). Other examples include but are not limited to mono-, di-, and tri-substituted sorbitans derived from palmitoleic acid, lineolic acid, arachidonic acid, and erucic acid.

In one embodiment, Formula (IIa') is employed, wherein R is further limited to independently a —H; —(CH$_2$CH$_2$O)$_n$(CH(CH$_3$)CH$_2$O)$_m$$R^2$; or —(CH$_2$CH$_2$O)$_n$(CH(CH$_3$)CH$_2$O)$_m$C(O)$R^1$. In this embodiment, at least one R is independently —(CH$_2$CH$_2$O)$_n$(CH(CH$_3$)CH$_2$O)$_m$$R^2$ or —(CH$_2$CH$_2$O)$_n$(CH(CH$_3$)CH$_2$O)$_m$C(O)$R^1$. In one aspect, $R^2$ is H and m is a positive integer such that the substitution is hydrophobic. Compounds of Formula (IIa'), wherein at least one R is —(CH$_2$CH$_2$O)$_n$(CH(CH$_3$)CH$_2$O)$_m$$R^2$ or —(CH$_2$CH$_2$O)$_n$(CH(CH$_3$)CH$_2$O)$_m$C(O)$R^1$, wherein each m is independently 0 to 20, each n is independently 0 to 20, and n+m is greater than 0 are known as polysorbates and are commercially available under the tradename TWEEN. These polysorbates can be mono-substituted, di-substituted, or tri-substituted with alkyl groups $R^1$ or $R^2$. It is known that commercially available polysorbates, contain a mixture of the various polysorbates ranging from where each $R^2$ is H (unsubsituted), and polysorbates where each $R^1$ is a linear or branched alkyl group having 5 to 29 carbons (fully substituted); and mixtures of various substitutions thereof. Examples of compounds of Formula (IIa') include polysorbates such as polysorbate tristearate, and polysorbate monostearate. Examples of compounds of Formula (IIa') wherein m+n is greater than 0, and wherein $R^1$ comprises at least 1 unsaturated bond, include but are not limited to, polysorbate trioleate (wherein $R^1$ is $C_7H_{14}CH=CHC_8H_{17}$), are sold commercially under the name Polysorbate 80. Reagents may include mixtures of compounds having various values for R, $R^1$, and $R^2$, and may also include mixtures of compounds where $R^1$ comprises at least one unsaturated bond with compounds where $R^1$ is fully saturated.

In one embodiment, the isocyanate-reactive compound (b) is selected from Formula (IIIb). Compounds of Formula (IIIb) are known as alkyl citrates. These citrates can be present as a mono-substituted, di-substituted, or tri-substituted compound with alkyl groups. It is known that commercially available citrates contain a mixture of the various citrates as well as citric acids from where R and each $R^4$ is —H, ranging to citrates where each $R^4$ is a linear or branched alkyl group having 6 to 30 carbons optionally comprising at least 1 unsaturated bond; and mixtures of various substitutions thereof. Mixtures of citrates having various values for $R^1$, $R^2$, and $R^4$ may be used, and may also include mixtures of compounds where $R^1$ comprises at least one unsaturated bond with compounds where $R^1$ is fully saturated. Alkyl citrates are also commercially available wherein m+n is greater than 0, $R^4$ is —$(CH_2CH_2O)_n(CH(CH_3)CH_2O)_mR^2$; or —$(CH_2CH_2O)_n(CH(CH_3)CH_2O)_mC(O)R^1$ and are present in the various substitutions from wherein R and each $R^2$ is H to wherein each $R^1$ and/or $R^2$ is a linear or branched alkyl group having 5 to 30 carbons optionally comprising at least 1 unsaturated bond. Examples of compounds of Formula (IIIb) include, but are not limited to, trialkyl citrates.

In one embodiment, the isocyanate-reactive compound (b) is selected from Formula (IIc). Compounds of Formula (IIc) are known as pentaerythriol esters. These pentaerythriol esters can be present as a mono-substituted, di-substituted, or tri-substituted with alkyl groups. Preferred compounds of Formula (IIc) are dipentaerythriol esters, where $R^{19}$ is —$CH_2C[CH_2OR]_3$. It is known that commercially available pentaerythriol esters contain a mixture of the various pentaerythriol esters where $R^{19}$ and each R is —H, ranging to pentaerythriol esters where each R is —$C(O)R^1$, and $R^1$ is a linear or branched alkyl group having 5 to 29 carbons optionally comprising at least 1 unsaturated bond; and mixtures of various substitutions thereof. The pentaerythriol esters also may contain compounds with mixtures of different chain lengths for R, or mixtures of compounds where $R^1$ comprises at least one unsaturated bond with compounds where $R^1$ is fully saturated.

Compounds of Formulas (IIa), (IIIb), and (IIc) can all be bio-based derived. By "bio-based derived", it is meant that at least 10% of the material can be produced from non-crude oil sources, such as plants, other vegetation, and tallow. In one embodiment, the substituted sugar alcohol is from about 10% to 100% bio-based derived. In one embodiment, the substituted sugar alcohol is from about 35% to 100% bio-based derived. In another embodiment, the substituted sugar alcohol is from about 50% to 100% bio-based derived. In one embodiment, the substituted sugar alcohol is from about 75% to 100% bio-based derived. In one embodiment, the substituted sugar alcohol is 100% bio-based derived. The average OH value of the substituted sugar alcohol compounds can range from just greater than 0 to about 230. In one embodiment, the average OH value is from about 10 to about 175, and in another embodiment, the average OH value is from about 25 to about 140.

Any diisocyanate or polyisocyanate having predominately two or more isocyanate groups, is suitable for use in this invention. For example, hexamethylene diisocyanate homopolymers are suitable for use herein and are commercially available. It is recognized that minor amounts of diisocyanates can remain in products having multiple isocyanate groups. An example of this is a biuret containing residual small amounts of hexamethylene diisocyanate.

Also suitable for use as the polyisocyanate reactant are hydrocarbon diisocyanate-derived isocyanurate trimers, where Q is a trivalent linear alkylene having an isocyanurate group. Preferred is DESMODUR N-100 (a hexamethylene diisocyanate-based compound available from Bayer Corporation, Pittsburgh, Pa.). Other triisocyanates useful for the purposes of this invention are those obtained by reacting three moles of toluene diisocyanate, where Q is a trivalent polyaromatic ring structure having a cyclized isocyanate group. The isocyanurate trimer of toluene diisocyanate and that of 3-isocyanatomethyl-3,4,4-trimethylcyclohexyl isocyanate are other examples of triisocyanates useful for the purposes of this invention, as is methane-tris-(phenylisocyanate). Precursors of polyisocyanate, such as diisocyanate, are also suitable for use in the present invention as substrates for the polyisocyanates. DESMODUR N-3300, DESMODUR N-3600, DESMODUR Z-4470, DESMODUR H, DESMODUR N3790, and DESMODUR XP 2410, from Bayer Corporation, Pittsburgh, Pa., and bis-(4-isocyanatocylohexyl)methane are also suitable in the invention.

Preferred polyisocyanate reactants are the aliphatic and aromatic polyisocyanates containing biuret structures, or polydimethyl siloxane containing isocyanates. Such polyisocyanates can also contain both aliphatic and aromatic substituents.

Preferred as the (poly)isocyanate reactant for all the embodiments of the invention herein are hexamethylene diisocyanate homopolymers commercially available, for instance as DESMODUR N-100, DESMODUR N-75 and DESMODUR N-3200 from Bayer Corporation, Pittsburgh, Pa.; 3-isocyanatomethyl-3,4,4-trimethylcyclohexyl isocyanate available, for instance as DESMODUR I (Bayer Corporation); bis-(4-isocyanatocylohexyl)methane available, for instance as DESMODUR W (Bayer Corporation) and diisocyanate trimers of Formulas (IIIa), (IIIb), (IIIc), (IIId), and (IIe):

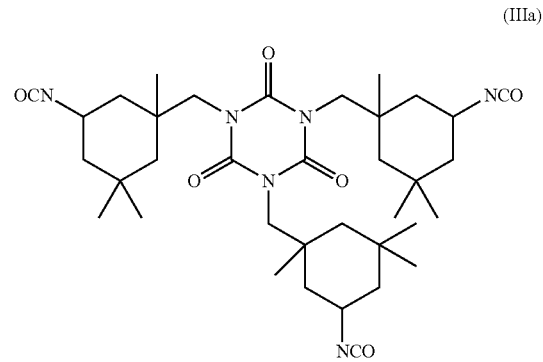

(IIIa)

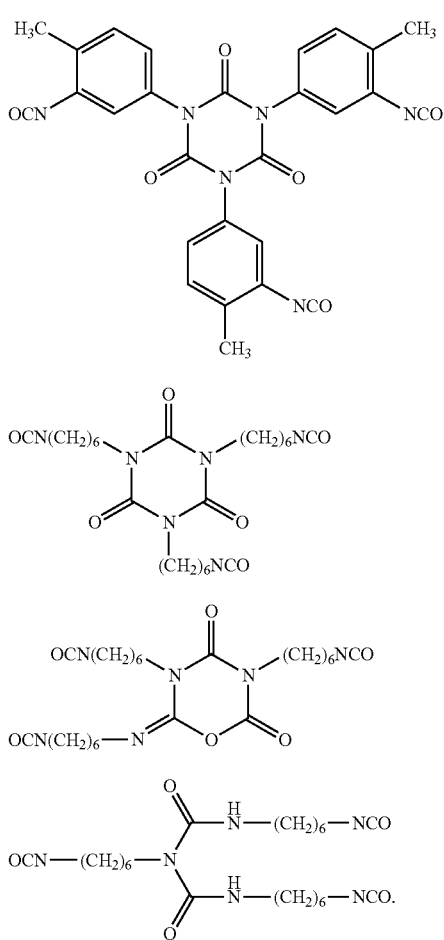

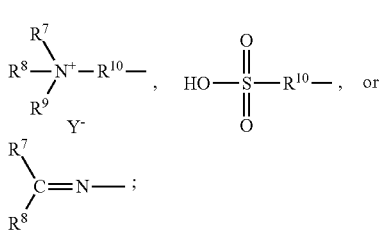

The diisocyanate trimers (IIIa-d) are available, for instance as DESMODUR Z4470, DESMODUR IL, DESMODUR N-3300, and DESMODUR XP2410, respectively, from Bayer Corporation.

Suitable isocyanate-reactive ethylenically unsaturated compounds (c) include any compound having an ethylenically unsaturated group that contains an isocyanate-reactive functional group, such as OH, amine, SH, or COOH. In one embodiment, the isocyanate-reactive ethylenically unsaturated compound (c) is selected from hydroxyalkyl vinyl compounds, allylic or methallylic polyether alcohols, aminoalkyl vinyl compounds, acrylic or methacrylic alkyl alcohols, acrylic or methacrylic polyether alcohols, or acrylic or methacrylic amines. Specific examples include but are not limited to poly(ethylene glycol) allyl ethers, hydroxyethyl (meth)acrylate, hydroxypropyl (meth)acrylate, hydroxybutyl (meth)acrylate, and ethoxylated (meth)acrylates.

Suitable bisulfate sources (d) include those compounds capable of reacting with an ethylenically unsaturated group to yield an —SO$_3$ salt. In one embodiment, the bisulfate source (d) is a metabisulfite salt, a bisulfite salt, or a mixture of SO$_2$ and base. Suitable cations include but are not limited to sodium and potassium. Specific examples include but are not limited to sodium metabisulfate or potassium metabisulfate.

In one embodiment, the reagents used to form the urethane compound further comprise at least one additional isocyanate-reactive compound (e) selected from water, organic compounds of Formula (IVa)

$$R^5\text{-D} \quad\quad\quad \text{(IVa), or}$$

organic compounds of Formula (IVb)

$$R^3\text{—}(OCH_2CH(OR^3)CH_2)_z\text{—}OR^3 \quad\quad \text{(IVb),}$$

or mixtures thereof, wherein $R^5$ is selected from a —$C_1$ to $C_{30}$ linear or branched alkyl optionally comprising at least one unsaturated group, a hydroxy-functional $C_1$ to $C_{30}$ linear or branched alkyl, a hydroxy-functional linear or branched $C_1$ to $C_{30}$ polyether, a hydroxy-functional linear or branched polyester having a polyester polymer backbone, a hydroxy-functional linear or branched organosiloxane, an amine-functional linear or branched organosiloxane, a thiol-functional $C_1$ to $C_{30}$ linear or branched alkyl, an amine-functional $C_1$ to $C_{30}$ linear or branched alkyl, D is selected from —$N(R^{12})H$, —OH, —COOH, —SH, —O—$(CH_2CH_2O)_s(CH(CH_3CH_2O)_t$—H, or (C(O)—O—$(CH_2CH_2O)_s(CH(CH_3)CH_2O)_t$H; $R^3$ is independently selected from —H; —$R^{18}$; or —C(O)$R^{18}$, provided that at least one $R^3$ is —H; $R^{12}$ is —H or a monovalent $C_1$ to $C_6$ alkyl group; $R^7$, $R^8$, and $R^9$ are each independently, —H, —$C_1$ to $C_6$ alkyl, or combinations thereof; $R^{10}$ is a divalent alkyl group of 1 to 20 carbons; $R^{18}$ is independently a linear or branched alkyl group having 5 to 29 carbons optionally comprising at least 1 unsaturated bond; z is 1 to 15; Y is Cl; s is an integer of 0 to 50; t is an integer of 0 to 50; and s+t is greater than 0. The term "branched", as used herein, means that the functional chain can be branched at any point, for example as a quarternary substituted carbon, and can contain any number of branched substitutions.

Preferably, the final compound contains 0% to about 1% of reactive isocyanate groups. In one embodiment, the molecular weight of the hydrophobic compound is at least 10,000 g/mol. In one embodiment, the isocyanate-reactive compound or compounds (b) compose 15 to 70% by mol of the total isocyanate-reactive reagents used to form the compound, the isocyanate-reactive ethylenically unsaturated compound (c) composes 10 to 70% by mol of the total isocyanate-reactive reagents, and the additional isocyanate-reactive compound (e) composes 0 to 70% by mol of the total isocyanate-reactive reagents. In one embodiment, the isocyanate-reactive compound or compounds (b) compose 30 to 60% by mol of the total isocyanate-reactive reagents used to form the compound, the isocyanate-reactive ethylenically unsaturated compound (c) composes 25 to 50% by mol of the total isocyanate-reactive reagents, and the additional isocyanate-reactive compound (e) composes 10 to 50% by mol of the total isocyanate-reactive reagents. In one embodiment, the isocyanate-reactive compound or compounds (b) compose 30 to 50% by mol of the total isocyanate-reactive reagents used to form the compound, the isocyanate-reactive ethylenically unsaturated compound (c) composes 25 to 45% by mol of the total isocyanate-reactive reagents, and the additional isocyanate-reactive compound (e) composes 25 to 45% by mol of the total isocyanate-reactive reagents. Preferably the sum of molar amount of compound (b) is greater than the sum of molar amount of compound (e).

In one embodiment, water is used to form urea linkages within the compound. In a further embodiment, a compound of Formula (IVa) is present, where D is —(CH$_2$CH$_2$O)$_s$(CH(CH$_3$CH$_2$O)$_t$—H, or (C(O)—O—(CH$_2$CH$_2$O)$_s$(CH(CH$_3$)CH$_2$O)$_t$H. In this embodiment, —(CH$_2$CH$_2$O)— represents oxyethylene groups (EO) and —(CH(CH$_3$)CH$_2$O)— represents oxypropylene groups (PO). These polyethers can contain only EO groups, only PO groups, or mixtures thereof. These polyethers can also be present as a tri-block copolymer designated PEG-PPG-PEG (polyethylene glycol-polypropylene glycol-polyethylene glycol). Preferably, the polyethers are the commercially available methoxypolyethylene glycols (MPEG's), or mixtures thereof. Also commercially available, and suitable for the preparation of the compositions of the present invention, are butoxypolyoxyalkylenes containing equal amounts by weight of oxyethylene and oxypropylene groups (Union Carbide Corp. 50-HB Series UCON Fluids and Lubricants) and having an average molecular weight greater than about 1000. In one aspect, the hydroxy-terminal polyethers of Formula (IVa) have an average molecular weight equal to or greater than about 200. In another aspect, the average molecular weight is between 350 and 2000.

In another embodiment, an organic compound of Formula (IVa) is used, where isocyanate-reactive group D is —OH, —C(O)OH, —SH, or —NH(R$^{12}$); and R$^5$ is selected from a —C$_1$ to C$_{30}$ linear or branched alkyl optionally comprising at least one unsaturated group, a hydroxy-functional C$_1$ to C$_{30}$ linear or branched alkyl, a hydroxy-functional linear or branched C$_1$ to C$_{30}$ polyether, a hydroxy-functional linear or branched polyester having a polyester polymer backbone, a hydroxy- or amine-functional linear or branched organosiloxane, a thiol-functional C$_1$ to C$_{30}$ linear or branched alkyl, an amine-functional C$_1$ to C$_{30}$ linear or branched alkyl.

Where D is —OH, examples of Formula (IVa) include but are not limited to alkyl alcohols such as propanol, butanol, or fatty alcohols including stearyl alcohol (R$^5$ is a —C$_1$ to C$_{30}$ linear or branched alkyl optionally comprising at least one unsaturated group); alkyl diols or polyols such as ethanediol, propanediol, butanediol, or hexanediol (R$^5$ is a hydroxy-functional C$_1$ to C$_{30}$ linear or branched alkyl); alkylene glycol ethers such as triethylene glycol, tetraethylene glycol, poly(ethylene glycol) (PEG), poly(propylene glycol) (PPG), poly(tetrahydrofuran), or glycol ethers having mixtures of PEG, PPG, or THF units (R$^5$ is a hydroxy-functional linear or branched C$_1$ to C$_{30}$ polyether); polyester polyols (R$^5$ is a hydroxy-functional linear or branched polyester having a polyester polymer backbone); silicone prepolymer polyols (R$^5$ is a hydroxy-functional linear or branched organosiloxane); N,N-dimethylaminoethanol (R$^5$ is an amine-functional C$_1$ to C$_{30}$ linear or branched alkyl); choline chloride or betaine HCl(R$^5$ is Y$^-$(R$^7$)(R$^8$)(R$^9$)N$^+$R$^{10}$—); butanone oxime (R$^5$ is (R$^7$)(R$^8$)C=N—). The polyether polyols can contain only EO groups, only PO groups, only THF groups, or mixtures thereof. These polyethers can also be present as a block copolymer, such as that designated by PEG-PPG-PEG (polyethylene glycol-polypropylene glycol-polyethylene glycol). In one aspect, the polyether glycols have an average molecular weight equal to or greater than about 200. In another aspect, the average molecular weight is between 350 and 2000.

Where D is A is —COOH, examples of Formula (IVa) include but are not limited to fatty acids such as caprylic acid, capric acid, lauric acid, mysteric acid, palmitic acid, stearic acid, arachidic acid, behenic acid, lignoceric acid, palmitoleic acid, lineolic acid, arachidonic acid, oleic acid, or erucic acid (R$^5$ is a —C$_1$ to C$_{30}$ linear or branched alkyl optionally comprising at least one unsaturated group); hydroxy-containing acids such as hydroxycaprylic acid, hydroxycapric acid, hydroxylauric acid, hydroxymysteric acid, hydroxypalmitic acid, hydroxystearic acid, hydroxyarachidic acid, hydroxybehenic acid, hydroxylignoceric acid, hydroxypalmitoleic acid, hydroxylineolic acid, hydroxyarachidonic acid, hydroxyoleic acid, or hydroxyerucic acid (R$^5$ is a hydroxy-functional C$_1$ to C$_{30}$ linear or branched alkyl); and mercaptoalkanoic acids such as mercaptopropionic acid (R$^5$ is a thiol-functional C$_1$ to C$_{30}$ linear or branched alkyl).

Where D is A is —SH, specific examples of Formula (IVa) include but are not limited to alkyl thiols such as lauryl mercaptan or dodecyl mercaptan (R$^5$ is a —C$_1$ to C$_{30}$ linear or branched alkyl optionally comprising at least one unsaturated group). Where D is —N(R$^{12}$)—C(O)—NH— or A is —NH(R$^{12}$), specific examples of Formula (IVa) include but are not limited to alkyl amines such as diisopropylamine, propylamine, hexylmine, or laurylamine (R$^5$ is a —C$_1$ to C$_{30}$ linear or branched alkyl optionally comprising at least one unsaturated group); alkanolamines such as ethanolamine or propanolamine (R$^5$ is a hydroxy-functional C$_1$ to C$_{30}$ linear or branched alkyl); silicone prepolymer polyamines (R$^5$ is a amine-functional linear or branched organosiloxane); alkyl diamines (R$^5$ is an amine-functional C$_1$ to C$_{30}$ linear or branched alkyl); and aminoalkanesulfonic acids such as 2-aminoethanesulfonic acid (R$^5$ is HO—S(O)$_2$R$^1$—).

In a further embodiment, a compound of Formula (IVb) I used. These compounds are commonly referred to as polyglycerols. These polyglycerols can be present where R$^3$ is independently a —H; —R$^{18}$; —C(O)R$^{18}$ provided that at least one R$^3$ is a —H; and wherein R$^{18}$ is independently a linear or branched alkyl group having 5 to 29 carbons optionally comprising at least 1 unsaturated bond. Specific examples include but are not limited to triglycerol monostearate, triglycerol distearate, hexaglycerol monostearate, hexaglycerol distearate, decaglyceryl mono(carpylate/caprate), decaglyceryl di(carpylate/caprate), decaglycerol, polyglycerol-3, and C$_{18}$ diglyceride.

In one embodiment, multiple compounds selected from Formulas (IVa), (IVb), and (IVc) are used. In addition to compounds of the present invention as described herein, these compositions may also comprise additional compounds that are present from commercially available sorbitans, polysorbates, alkyl citrates, or pentaethritols. These compounds can be present as a mixture of the various substituted sugar alcohols from fully unsubstituted to fully substituted, and the various substitutions in between, and optionally, the linear or branched alkyl group having 5 to 29 carbons comprises at least 1 unsaturated bond.

The compounds are preferably part of an aqueous composition but may further comprise a solvent selected from organic solvents. The aqueous composition may be in the form of an aqueous solution, an aqueous emulsion, or an aqueous dispersion.

In one embodiment, the invention is drawn to a method of preparing a compound comprising (i) reacting (a) at least one isocyanate group-containing compound selected from diisocyanate, polyisocyanate, or mixture thereof; (b) at least one isocyanate-reactive compound selected from the group consisting of a fluorinated alcohol; a cyclic or acyclic sugar alcohol which is substituted with at least one —R$^1$, —C(O)R$^1$, —(CH$_2$CH$_2$O)$_n$(CH(CH$_3$)CH$_2$O)$_m$R$^2$, —(CH$_2$CH$_2$O)$_n$(CH(CH$_3$)CH$_2$O)$_m$C(O)R$^1$, or mixtures thereof; and mixtures of a fluorinated alcohol and a cyclic or acyclic sugar alcohol which is substituted with at least one —R$^1$, —C(O)R$^1$, —(CH$_2$CH$_2$O)$_n$(CH(CH$_3$)CH$_2$O)$_m$R$^2$, —(CH$_2$CH$_2$O)$_n$(CH(CH$_3$)CH$_2$O)$_m$C(O)R$^1$, or mixtures thereof; and (c) at least one isocyanate-reactive ethylenically unsaturated compound; where the cyclic or acyclic sugar alcohol is selected from a saccharide, reduced sugar, aminosaccharide, aldonic acid, or aldonic acid lactone; wherein each n is independently 0 to 20; each m is independently 0 to 20; m+n is greater than 0; each R$^1$ is independently a linear or branched alkyl group having 5 to 29 carbons optionally comprising at least 1 unsaturated bond; each R$^2$ is independently —H, or a linear or branched alkyl group having 6 to 30 carbons optionally comprising at least 1 unsaturated bond, or mixtures thereof; and (ii) reacting the reaction product of step (i) with (d) a bisulfate source in the presence of a radical initiator.

The reaction product of step (i) can be made in one step, including those compounds made with mixtures of compounds (b) or mixtures of compounds (e). In one embodiment, if more than one compound (b) or (e) is present, then the synthesis can be completed sequentially. A sequential addition is especially useful when employing substituted sugar alcohols with high OH numbers, or when using polyfunctional compounds of Formulas (IVa) or (IVb). In this case, molar concentrations of the isocyanate-reactive compound (b) are such that there remains unreacted isocyanate groups to react with compounds (c) and (e).

This reaction is typically conducted by charging a reaction vessel with the diisocyanate and/or polyisocyanate, the at least one isocyanate-reactive compound (b), the isocyanate-reactive ethylenically unsaturated compound (c), and optionally an additional isocyanate-reactive compound (e). The order of reagent addition is not critical, but if water is used, the water should be added after the isocyanate(s) and compounds (b) and (c).

The specific weight of the reactants charged is based on their equivalent weights and on the working capacity of the reaction vessel, and is adjusted so that substituted sugar alcohol will be consumed in the first step. A suitable dry organic solvent free of isocyanate-reactive groups is typically used as a solvent. Ketones are the preferred solvents, and methylisobutylketone (MIBK) is particularly preferred for convenience and availability. The charge is agitated, and temperature adjusted to about 40° C. to 70° C. Typically, a catalyst such as iron(III) chloride in an organic solvent is then added, typically in an amount of from about 0.01 to about 1.0 weight % based on the dry weight of the composition, and the temperature is raised to about 80° C. to 100° C. A co-catalyst, such as sodium carbonate, may also be used. If water is to be added, the initial reaction is conducted so that less than 100% of the isocyanate groups are reacted. In the second step after holding for several hours, additional solvent, water, and optionally a second compound are added. In one embodiment, and the mixture is allowed to react for several more hours or until all of the isocyanate has been reacted. Additional water can then be added along with surfactants, if desired, to the urethane compounds and stirred until thoroughly mixed. Following a homogenization or sonification step, the organic solvent can be removed by evaporation at reduced pressure.

The sulfonation step may follow the process of U.S. Pat. No. 5,117,041. For example, a bisulfate source may be contacted with the functional urethane polymer in the presence of a free radical initiator and an aqueous medium, adding the bisulfate source in increments over time to yield sulfinate-containing sulfonated products. The sulfinate content is then oxidized to give sulfonated urethane polymers.

It will be apparent to one skilled in the art that many changes to any or all of the above procedures can also be used to optimize the reaction conditions for obtaining maximum yield, productivity, or product quality.

In another embodiment, the invention relates to a method of reducing the surface tension of an aqueous medium comprising contacting the aqueous medium with a compound comprising the reaction product of reagents comprising: (a) at least one isocyanate group-containing compound selected from diisocyanate, polyisocyanate, or mixture thereof; (b) at least one isocyanate-reactive compound selected from the group consisting of a fluorinated alcohol; a cyclic or acyclic sugar alcohol which is substituted with at least one —R$^1$, —C(O)R$^1$, —(CH$_2$CH$_2$O)$_n$(CH(CH$_3$)CH$_2$O)$_m$R$^2$, —(CH$_2$CH$_2$O)$_n$(CH(CH$_3$)CH$_2$O)$_m$C(O)R$^1$, or mixtures thereof; and mixtures of a fluorinated alcohol and a cyclic or acyclic sugar alcohol which is substituted with at least one —R$^1$, —C(O)R$^1$, —(CH$_2$CH$_2$O)$_n$(CH(CH$_3$)CH$_2$O)$_m$R$^2$, —(CH$_2$CH$_2$O)$_n$(CH(CH$_3$)CH$_2$O)$_m$C(O)R$^1$, or mixtures thereof; where the cyclic or acyclic sugar alcohol is selected from a saccharide, reduced sugar, aminosaccharide, aldonic acid, or aldonic acid lactone; wherein each n is independently 0 to 20; each m is independently 0 to 20; m+n is greater than 0; each R$^1$ is independently a linear or branched alkyl group having 5 to 29 carbons optionally comprising at least 1 unsaturated bond; each R$^2$ is independently —H, or a linear or branched alkyl group having 6 to 30 carbons optionally comprising at least 1 unsaturated bond, or mixtures thereof; (c) at least one isocyanate-reactive ethylenically unsaturated compound; and (d) a bisulfate source.

The aqueous medium may be any suitable medium, including but not limited to water, aqueous repellency treatment coatings, water-based floor finishes, or aqueous paints. In one embodiment, the invention relates to a coating composition made by contacting the inventive compound with an aqueous coating base. In one embodiment, the coating comprises a coating base selected from the group consisting of an acrylic polymer, epoxy polymer, vinyl polymer, and polyurethane polymer in the form of an inerior house paint, exterior house paint, stain, or clear coating. Such paints are readily available in the marketplace under a number of major brands. Such coatings may be unpigmented or may be pigmented with compounds including but not limited to titanium dioxide.

In another embodiment, the coating is a floor wax, floor finish, or floor polish. Floor waxes, polishes, or finishes are generally water-based or solvent-based polymer emulsions. Commercially available floor finish compositions typically are aqueous emulsion-based polymer compositions comprising one or more organic solvents, plasticizers, coating aides, anti-foaming agents, surfactants, polymer emulsions, metal complexing agents, and waxes. The particle size range and solids content of the polymer are usually controlled to control the product viscosity, film hardness and resistance to deterioration. Polymers containing polar groups function to enhance solubility and may also act as wetting or leveling agents providing good optical properties such a high gloss and distinctness of reflected image. Preferred polymers for use in floor finishes include acrylic polymers, polymers derived from cyclic ethers, and polymers derived from vinyl substituted aromatics. Polyesters, polyamides, polyurethanes and polysiloxanes are also used in floor finishes. The waxes or mixtures of waxes that are used in floor finishes include waxes of a vegetable, animal, synthetic, and/or mineral origin. Representative waxes include, for example, carnuba, candelilla, lanolin, stearin, beeswax, oxidized polyethylene wax, polyethylene emulsions, polypropylene, copolymers of ethylene and acrylic esters, hydrogenated coconut oil or soybean oil, and the mineral waxes such as paraffin or ceresin.

In another embodiment, the invention relates to a method of providing a surface effect to a fibrous substrate comprising contacting a fibrous substrate with a compound comprising the reaction product of reagents comprising: (a) at least one isocyanate group-containing compound selected from diisocyanate, polyisocyanate, or mixture thereof; (b) at least one isocyanate-reactive compound selected from the group consisting of a fluorinated alcohol; a cyclic or acyclic sugar alcohol which is substituted with at least one —$R^1$, —$C(O)R^1$, —$(CH_2CH_2O)_n(CH(CH_3)CH_2O)_mR^2$, —$(CH_2CH_2O)_n(CH(CH_3)CH_2O)_mC(O)R^1$, or mixtures thereof; and mixtures of a fluorinated alcohol and a cyclic or acyclic sugar alcohol which is substituted with at least one —$R^1$, —$C(O)R^1$, —$(CH_2CH_2O)_n(CH(CH_3)CH_2O)_mR^2$, —$(CH_2CH_2O)_n(CH(CH_3)CH_2O)_mC(O)R^1$, or mixtures thereof; where the cyclic or acyclic sugar alcohol is selected from a saccharide, reduced sugar, aminosaccharide, aldonic acid, or aldonic acid lactone; wherein each n is independently 0 to 20; each m is independently 0 to 20; m+n is greater than 0; each $R^1$ is independently a linear or branched alkyl group having 5 to 29 carbons optionally comprising at least 1 unsaturated bond; each $R^2$ is independently —H, or a linear or branched alkyl group having 6 to 30 carbons optionally comprising at least 1 unsaturated bond, or mixtures thereof; (c) at least one isocyanate-reactive ethylenically unsaturated compound; and (d) a bisulfate source.

The composition of the present invention as described above is contacted with the fibrous substrate by any suitable method. Such methods include, but are not limited to, application by exhaustion, foam, flex-nip, nip, pad, kiss-roll, beck, skein, winch, liquid injection, overflow flood, roll, brush, roller, spray, dipping, immersion, and the like. The composition is also contacted by use of a beck dyeing procedure, continuous dyeing procedure or thread-line application.

The composition of the present invention is applied to the substrate as such, or in combination with other optional textile finishes or surface treating agents. Such optional additional components include treating agents or finishes to achieve additional surface effects, or additives commonly used with such agents or finishes. Such additional components comprise compounds or compositions that provide surface effects such as no iron, easy to iron, shrinkage control, wrinkle free, permanent press, moisture control, softness, strength, anti-slip, anti-static, anti-snag, anti-pill, stain release, soil repellency, soil release, water repellency, odor control, antimicrobial, sun protection, cleanability and similar effects. Such components may be fluorinated or non-fluorinated. One or more of such treating agents or finishes are applied to the substrate before, after, or simultaneously with the composition of the present invention. For example, for fibrous substrates, when synthetic or cotton fabrics are treated, use of a wetting agent can be desirable, such as ALKANOL 6112 available from E. I. du Pont de Nemours and Company, Wilmington, Del. When cotton or cotton-blended fabrics are treated, a wrinkle-resistant resin can be used such as PERMAFRESH EFC available from Omnova Solutions, Chester, S.C.

Other additives commonly used with such treating agents or finishes are also optionally present, such as surfactants, pH adjusters, cross linkers, wetting agents, wax extenders, and other additives known by those skilled in the art. Suitable surfactants include anionic, cationic, nonionic, N-oxides and amphoteric surfactants. Examples of such additives include processing aids, foaming agents, lubricants, anti-stains, and the like. The composition is applied at a manufacturing facility, retailer location, or prior to installation and use, or at a consumer location.

Optionally, a blocked isocyanate is added with the composition of the present invention to further promote durability (i.e., as a blended composition). An example of a suitable blocked isocyanate to use in the present invention is PHOBOL XAN available from Huntsman Corp, Salt Lake City, Utah Other commercially available blocked isocyanates are also suitable for use herein. The desirability of adding a blocked isocyanate depends on the particular application for the copolymer. For most of the presently envisioned applications, it does not need to be present to achieve satisfactory cross-linking between chains or bonding to the substrate. When added as a blended isocyanate, amounts up to about 20% by weight are added.

The optimal treatment for a given substrate depends on (1) the characteristics of the compound or composition of the present invention, (2) the characteristics of the surface of the substrate, (3) the amount of compound or composition of the present invention applied to the surface, (4) the method of application of the compound or composition of the present invention onto the surface, and many other factors. Some compounds or compositions of the present invention work well on many different substrates and are repellent to water. Dispersions prepared from compounds of the present invention are generally applied to fibrous substrates by spraying, dipping, padding, or other well-known methods. After excess liquid has been removed, for example by squeeze rolls, the treated fibrous substrate is dried and then cured by heating, for example, to from about 100° C. to about 190° C., for at least 30 seconds, typically from about 60 to about 240 seconds. Such curing enhances oil-, water- and soil repellency and durability of the repellency. While these curing conditions are typical, some commercial apparatus may operate outside these ranges because of its specific design features.

In another embodiment, the present invention is a fibrous substrate having applied to its surface a compound as disclosed above. The fibrous substrates include fibers, yarns, fabrics, fabric blends, textiles, nonwovens, paper, leather, and carpets. These are made from natural or synthetic fibers including cotton, cellulose, wool, silk, rayon, nylon, aramid, acetate, acrylic, jute, sisal, sea grass, coir, polyamide, polyester, polyolefin, polyacrylonitrile, polypropylene, polyaramid, or blends thereof. By "fabric blends" is meant fabric made of two or more types of fibers. Typically these blends are a combination of at least one natural fiber and at least one synthetic fiber, but also can include a blend of two or more natural fibers or of two or more synthetic fibers. The nonwoven substrates include, for example, spunlaced nonwovens, such as SONTARA available from E. I. du Pont de Nemours and Company, Wilmington, Del., and spunbonded-meltblown-spunbonded nonwovens. The treated substrates of the present invention have excellent water repellency and optionally stain release properties.

The compounds of the present invention are useful to provide excellent stain release to treated substrates and compositions which are comparable to commercially available fluorinated treating agents.

Test Methods and Materials

All solvents and reagents, unless otherwise indicated, were purchased from Sigma-Aldrich, St. Louis, Mo., and used directly as supplied. MPEG 750 and MPEG 350 are defined as poly(ethylene glycol) methyl ether 750 and poly(ethylene glycol) methyl ether 350, respectively, and are commercially available from Sigma-Aldrich, St. Louis, Mo. Tergitol® TMN-10 and TWEEN 85 are commercially available from Sigma-Aldrich, St. Louis, Mo.

Sorbitan tristearate is commercially available from Croda, East Yorkshire, England, or DuPont Nutrition & Health, Copenhagen, Denmark. Sorbitan ester-lauric acid, pentaerythritol tristearate, and sorbitan tribehenin are available from DuPont Nutrition & Health, Copenhagen, Denmark. Sorbitan trioleate was obtained from Croda, East Yorkshire, England.

DESMODUR N-100 and DESMODUR N3300 were obtained from Bayer Corporation, Pittsburgh, Pa.

Pentaerythritol Stearate

Citrate G-66 is a trioctyldecyl citrate commercially available from Lubrizol, Wickliffe, Ohio.

BLEMMER PKA 5004, 5005, and 5013 are polyethylene glycol allyl ethers commercially available from NOF Corporation, Tokyo, Japan.

6,2-alcohol is 3,3,4,4,5,5,6,6,7,7,8,8-tridecafluoro-1-octanol and is available from DuPont Chemicals and Fluoroproducts, Wilmington, Del.

The following test methods and materials were used in the examples herein.

Test Method 1—
Water Repellency

The water repellency of a treated substrate was measured according to the DuPont Technical Laboratory Method as outlined in the TEFLON Global Specifications and Quality Control Tests information packet. The test determines the resistance of a treated substrate to wetting by aqueous liquids. Drops of water-alcohol mixtures of varying surface tensions are placed on the fabric and the extent of surface wetting is determined visually. The test provides a rough index of aqueous stain resistance. The higher the water repellency rating, the better the resistance the finished substrate has to staining by water-based substances. The composition of standard test liquids is shown in the following Table 1. Ratings of 0.5 increments are determined by subtracting one half from the numbers in Table 1 for borderline passing of the test liquid.

TABLE 1

Standard Test Liquids

| Water Repellency Rating | Composition Vol. %, Isopropyl Alcohol | Composition Vol. %, Distilled Water |
| --- | --- | --- |
| 1 | 2 | 98 |
| 2 | 5 | 95 |
| 3 | 10 | 90 |
| 4 | 20 | 80 |
| 5 | 30 | 70 |
| 6 | 40 | 60 |
| 7 | 50 | 50 |
| 8 | 60 | 40 |
| 9 | 70 | 30 |
| 10 | 80 | 20 |
| 11 | 90 | 10 |
| 12 | 100 | 0 |

Test Method 2—
Oil Repellency

The treated fabric samples were tested for oil repellency by a modification of AATCC standard Test Method No. 118, conducted as follows: A fabric sample, treated with an aqueous dispersion of polymer, was conditioned for a minimum of 15 hours at 23° C.+65% relative humidity prior to testing. A series of organic liquids, identified below in Table 2, were then applied drop wise to the fabric samples. Beginning with the lowest numbered test liquid (Repellency Rating No. 1), one drop (approximately 5 mm in diameter or 0.05 mL volume) was placed on each of three locations at least 5 mm apart. The drops were observed for 30 seconds. If, at the end of this period, two of the three drops were still spherical in shape with no wicking around the drops, three drops of the next highest numbered liquid were placed on adjacent sites and similarly observed for 30 seconds. The procedure was continued until one of the test liquids resulted in two of the three drops failing to remain spherical to hemispherical, or wetting or wicking occurred.

The oil repellency rating of the fabric was the highest numbered test liquid for which two of the three drops remained spherical to hemispherical, with no wicking for 30 seconds. Ratings of 0.5 increments were determined by subtracting one-half from the number in Table 2 for borderline passing of the next liquid. Higher ratings indicate greater repellency. The composition of oil repellency test liquids is shown in the Table 2.

TABLE 2

Oil Repellency Test Liquids

| Oil Repellency Rating | Test Solution |
| --- | --- |
| 1 | NUJOL Purified Mineral Oil |
| 2 | 65/35 NUJOL/n-hexadecane by volume at 21° C. |
| 3 | n-hexadecane |
| 4 | n-tetradecane |
| 5 | n-dodecane |
| 6 | n-decane |

Test Method 3—
Spray Test

The dynamic water repellency of treated substrates was measured according to the American Association of Textile Chemists and Colorists (AATCC) TM-22. Samples are visually scored by reference to published standards, with a rating of 100 denoting no water penetration or surface adhesion. A rating of 90 denotes slight random sticking or wetting without penetration; lower values indicate progressively greater wetting and penetration. Test Method 2, the dynamic water repellency test, is a demanding and realistic test of water repellency.

Test Method 4—
Stain Release

This test measures the ability of a fabric to release oily stains during home laundering.

Treated textiles are placed on a flat surface. Using an eyedropper, 5 drops of MAZOLA Corn Oil or mineral oil (0.2 mL) were placed onto the fabric to form 1 drop of oil. A weight (5 lb, 2.27 kg) is placed on top of the oil drop with a piece of glassine paper separating the oil drop. The weight was left in place for 60 seconds. After 60 seconds, the weight and glassine paper are removed. The textiles samples were then washed using a automatic washer high for 12 minutes with AATCC 1993 Standard Reference Detergent WOB12 or granular detergent (100 g). The textiles were then dried on high for 45-50 minutes. The textiles were then evaluated for residual stain of 1 to 5, 1 having the largest residual stain remaining and 5 being no stain residual was visible. In the examples below, stain release ratings of corn oil are designated by the term "Corn Oil", and stain release ratings of mineral oil are designated by the term "Mineral Oil".

Test Method 5—
Fabric Treatment

The fabrics treated in this study were 100% by weight khaki cotton twill available from SDL Atlas Textile Testing Solutions, Rock Hill, S.C. 29732 and 100% by weight red polyester fabric available from L. Michael OY, Finland. The fabric was treated with the aqueous dispersions various emulsion polymer using a conventional pad bath (dipping) process. The prepared concentrated dispersion of the polymer emulsions were diluted with deionized water to 10% by weight of polymer solids.

Examples of the compounds and compositions of the instant invention can be made from various isocyanates and isocyanate-reactive compounds, or mixtures thereof. The present invention is not to be limited by the examples below.

Preparation of Urethane 1 (U1)

A dry 4-neck 500 mL round bottom flask was assembled with a thermocouple, mechanical stirrer, a nitrogen inlet, condenser, and gas outlet. The flask was charged with DESMODUR N3300 (12.0 g), MIBK (87.4 g), and FeCl₃ solution (0.5 wt % in MIBK, 0.5 g). The reaction mixture was heated to 60° C. BLEMMER PKA 5004 (23.32 g) and Na₂CO₃ (0.55 g) were added to the flask, the temperature was raised to 95° C., and the mixture was stirred for one hour. After one hour, sorbitan tristearate (22.95 g) was added, and the reaction was stirred overnight at 95° C. When the reaction tested negative for active isocyanates, warm DI water (235.2 g) and diacetin (14.7 g) were mixed into a plastic container and added to the flask. The mixture was stirred for 30 minutes at 75° C. MIBK was removed via distillation, and the product was filtered through a milk filter.

Preparation of Urethane 2 (U2)

The Preparation of Urethane 1 procedure was repeated, using DESMODUR N3300 (19.89 g), MIBK (246.3 g), and FeCl₃ solution (0.5 wt % in MIBK, 0.83 g), BLEMMER PKA 5013 (106.3 g), Na₂CO₃ (0.91 g), sorbitan tristearate (38.04 g), and warm DI water (660 g).

Preparation of Urethane 3 (U3)

A dry 4-neck 500 mL round bottom flask was assembled with a thermocouple, mechanical stirrer, a nitrogen inlet, condenser, and gas outlet. The flask was charged with DESMODUR N100 (17.47 g), MIBK (10.8 g), and FeCl₃ solution (0.5 wt % in MIBK, 0.49 g). BLEMMER PKA 5004 (10.8 g) and MPEG 750 (10.8 g) were added to the flask. The temperature was then raised to 95° C. and stirred for one hour. After one hour, perfluorhexylethyl alcohol (14.0 g) was added. The reaction was stirred for four hours, and water (4.0 g) and MIBK (13.4) were added. The reaction was stirred at 95° C. When the reaction tested negative for active isocyanates, warm DI water (212.5 g) was added to the flask and the mixture was stirred for 30 minutes at 75° C. MIBK was removed via distillation, and the product was filtered through a milk filter.

Preparation of Urethanes 4-23 (U4-U23)

A dry 30-mL vial was charged with DESMODUR N3300 (1.5 g), MIBK (40 wt % solution after addition of all components), FeCl₃ catalyst solution (0.5 wt % in MIBK, 0.06-0.10 g), and Na₂CO₃ (68 mg). A nitrogen line was connected and the mixture was heated to 60° C. MPEG (750 or 350) and Blemmer PKA (5004, 5005, or 5013) were added according to Table 3. The temperature was raised to 95° C. and stirred for 1 hour. Then fluorinated alcohols and/or substituted sugar alcohols were added according to Table 3, and the reaction was stirred overnight. When the reaction tested negative for active isocyanates, hot DI water was added to the vial. The mixture was transferred to a round bottom flask and combined with additional hot DI water to yield a product at 10-20% solids of urethane polymer. MIBK was removed via rotary evaporation.

TABLE 3

Reagents Used in Urethanes 4-23

| | Compound (b) | | Compound (c) | | Additional Monomer | |
|---|---|---|---|---|---|---|
| | Compound | Amt (g) | Compound | Amt (g) | Compound | Amt (g) |
| U4 | 6,2-alcohol | 1.41 | PKA 5004 | 2.94 | | |
| U5 | 6,2-alcohol | 1.41 | PKA 5004 | 1.47 | MPEG 750 | 1.46 |
| U6 | 6,2-alcohol | 1.41 | PKA 5004 | 1.47 | MPEG 350 | 0.68 |
| U7 | 6,2-alcohol | 1.41 | PKA 5005 | 2.99 | MPEG 750 | 1.46 |
| U8 | 6,2-alcohol | 1.41 | PKA 5013 | 4.01 | MPEG 750 | 1.46 |
| U9 | Sorbitan tristearate/ 6,2-alcohol | 1.43/ 0.71 | PKA 5004 | 2.94 | | |
| U10 | Sorbitan tristearate/ 6,2-alcohol | 1.43/ 0.71 | PKA 5004 | 1.47 | MPEG 750 | 1.46 |
| U11 | Sorbitan tristearate/ 6,2-alcohol | 1.43/ 0.71 | PKA 5005 | 2.99 | MPEG 750 | 1.46 |
| U12 | Sorbitan trilaurate | 1.75 | PKA 5004 | 1.47 | MPEG 750 | 1.46 |
| U13 | Sorbitan trilaurate | 3.82 | PKA 5004 | 1.47 | MPEG 750 | 2.91 |
| U14 | TWEEN 85 | 5.19 | PKA 5004 | 1.47 | MPEG 750 | 1.46 |
| U15 | Sorbitan tristearate | 2.87 | PKA 5004 | 1.47 | MPEG 750 | 1.46 |
| U16 | Sorbitan tristearate | 2.87 | PKA 5013 | 4.01 | MPEG 750 | 1.46 |
| U17 | Sorbitan tristearate | 2.87 | PKA 5005 | 2.99 | MPEG 750 | 1.46 |
| U18 | Sorbitan tristearate | 2.87 | PKA 5004 | 1.47 | MPEG 350 | 0.68 |
| U19 | Sorbitan tribehenin | 3.28 | PKA 5004 | 1.75 | MPEG 750 | 1.35 |
| U20 | Sorbitan trilaurate | 7.65 | PKA 5004 | 1.47 | MPEG 750 | 1.46 |
| U21 | Sorbitan trioleate | 3.41 | PKA 5004 | 1.80 | MPEG 750 | 1.20 |
| U22 | Citrate G-66 | 4.02 | PKA 5004 | 1.47 | MPEG 750 | 1.46 |
| U23 | Pentaerythritol tristearate | 3.57 | PKA 5004 | 1.47 | MPEG 750 | 1.46 |

Comparative Example A

Untreated fabric samples were tested according to the test methods above. Both cotton and polyester fabrics had a water drop rating of 0, an oil drop rating of 0, and a spray rating of 0.

Examples 1-23

The pH of the polyurethane solution (U1 to U23) was adjusted to 2.00-3.25 with sulfuric acid and weighed into a glass container with a rubber septum. Solid sodium metabisulfite (20% of total amount, 0.40 molar equivalent of PKA monomer) was added, and the mixture was stirred at room temperature until homogeneous. Iron (II) sulfate pentahydrate was added (0.001 molar equivalent of PKA monomer). Sodium persulfate solution 12.5 wt % in water was added (0.041 molar equivalent of PKA monomer). The mixture was stirred at room temperature under atmospheric pressure for 1 hour. The rest of sodium metabisulfite (80% of total amount, 1.60 molar equivalent of PKA monomer) was added. Additional catalyst sodium persulfate solution was added (0.041 molar equivalent of PKA monomer). The mixture was stirred at room temperature for 1 hour and the third portion of sodium persulfate solution was added (0.041 molar equivalent of PKA monomer). The mixture was stirred for one more hour, and the pH was adjusted to 4.0-5.5 with sodium hydroxide solution. 30% hydrogen peroxide solution (0.6 molar equivalent of PKA monomer) was added. The mixture was stirred for one hour at room temperature. When a peroxide test indicated a negative response, the pH was adjusted to ~5.0. Each solution was diluted to 10.0% solids, applied on fabric and tested according to the test methods above.

TABLE 4

Performance Data of Examples 1-23 on Cotton

| Example | Urethane | Water Drop | Oil Drop | Spray Rating | Corn Oil | Mineral Oil |
|---|---|---|---|---|---|---|
| 1 | U1 | 3 | 0 | 70 | 2 | 2 |
| 2 | U2 | 2 | 0 | 60 | 1 | 1 |
| 3 | U3 | 1 | 6 | 50 | 4 | 4 |
| 4 | U4 | 1 | 5 | 50 | 5 | 5 |
| 5 | U5 | 1 | 6 | 50 | 5 | 5 |
| 6 | U6 | 1 | 6 | 60 | 4 | 4 |
| 7 | U7 | 1 | 6 | 60 | 5 | 5 |
| 8 | U8 | 1 | 5 | 60 | 5 | 5 |
| 9 | U9 | 1 | 5 | 60 | 5 | 5 |
| 10 | U10 | 1 | 2 | 50 | 3 | 3 |
| 11 | U11 | 3 | 5 | 70 | 4 | 3 |
| 12 | U12 | 1 | 0 | 50 | 2 | 2 |
| 13 | U13 | 1 | 0 | 50 | 3 | 3 |
| 14 | U14 | 0 | 0 | 0 | 2 | 2 |
| 15 | U15 | 3 | 0 | 70 | 2 | 2 |
| 16 | U16 | 2 | 0 | 60 | 3 | 3 |
| 17 | U17 | 3 | 0 | 60 | 5 | 4.5 |
| 18 | U18 | 3 | 0 | 70 | 4 | 4 |
| 19 | U19 | 3 | 0 | 60 | 4 | 4 |
| 20 | U20 | 0 | 0 | 50 | 4 | 3 |
| 21 | U21 | 0 | 0 | 0 | 2 | 2 |
| 22 | U22 | 0 | 0 | 0 | 2 | 2 |
| 23 | U23 | 3 | 0 | 70 | 4 | 3 |

TABLE 5

Performance Data of Examples 1-23 on Polyester

| Example | Urethane | Water Drop | Oil Drop | Spray Rating | Corn Oil | Mineral Oil |
|---|---|---|---|---|---|---|
| 1 | U1 | 1 | 0 | 50 | 4 | 2 |
| 2 | U2 | 0 | 0 | 50 | 1 | 1 |
| 3 | U3 | 1 | 5 | 50 | 2 | 4 |
| 4 | U4 | 0 | 4 | 50 | 5 | 5 |
| 5 | U5 | 0 | 4 | 50 | 4.5 | 5 |
| 6 | U6 | 0 | 4 | 50 | 4 | 3 |
| 7 | U7 | 0 | 4 | 50 | 2 | 4 |
| 8 | U8 | 0 | 3 | 50 | 1 | 2 |
| 9 | U9 | 0 | 4 | 50 | 5 | 5 |
| 10 | U10 | 0 | 1 | 50 | 3 | 3 |
| 11 | U11 | 0 | 5 | 50 | 4 | 4 |
| 12 | U12 | 0 | 0 | 0 | 2 | 1 |
| 13 | U13 | 0 | 0 | 0 | 1 | 1 |
| 14 | U14 | 0 | 0 | 0 | 2 | 1 |
| 15 | U15 | 0 | 0 | 50 | 2 | 2 |
| 16 | U16 | 0 | 0 | 50 | 2 | 3 |
| 17 | U17 | 0 | 0 | 50 | 4.5 | 5 |
| 18 | U18 | 2 | 0 | 50 | 5 | 5 |
| 19 | U19 | 1 | 0 | 50 | 4 | 2 |
| 20 | U20 | 0 | 0 | 0 | 1 | 1 |
| 21 | U21 | 0 | 0 | 0 | 4 | 2 |
| 22 | U22 | 0 | 0 | 0 | 2 | 2 |
| 23 | U23 | 0 | 0 | 50 | 2 | 3 |

What is claimed is:

1. A compound having 0 to about 1% reactive isocyanate groups comprising the reaction product of reagents comprising:
   (a) at least one isocyanate group-containing compound selected from diisocyanate, polyisocyanate, or mixture thereof;
   (b) at least one isocyanate-reactive compound selected from the group consisting of a fluorinated alcohol; a cyclic or acyclic sugar alcohol which is substituted with at least one $R^1$, —C(O)$R^1$, —(CH$_2$CH$_2$O)$_n$(CH(CH$_3$)CH$_2$O)$_m$$R^2$, —(CH$_2$CH$_2$O)$_n$(CH(CH$_3$)CH$_2$O)$_m$C(O)$R^1$, or mixtures thereof; and mixtures of a fluorinated alcohol and a cyclic or acyclic sugar alcohol which is substituted with at least one $R^1$, —C(O)$R^1$, —(CH$_2$CH$_2$O)$_n$(CH(CH$_3$)CH$_2$O)$_m$$R^2$, —(CH$_2$CH$_2$O)$_n$(CH(CH$_3$)CH$_2$O)$_m$C(O)$R^1$, or mixtures thereof;
   where the cyclic or acyclic sugar alcohol is selected from a saccharide, reduced sugar, aminosaccharide, aldonic acid, or aldonic acid lactone; wherein
   each n is independently 0 to 20;
   each m is independently 0 to 20;
   m+n is greater than 0;
   each $R^1$ is independently a linear or branched alkyl group having 5 to 29 carbons optionally comprising at least 1 unsaturated bond;
   each $R^2$ is independently —H, or a linear or branched alkyl group having 6 to 30 carbons optionally comprising at least 1 unsaturated bond, or mixtures thereof;
   (c) at least one isocyanate-reactive ethylenically unsaturated compound selected from allylic or methallylic polyether alcohols, aminoalkyl vinyl compounds, acrylic or methacrylic alkyl alcohols, acrylic or methacrylic polyether alcohols, or acrylic or methacrylic amines; and
   (d) a bisulfate source.

2. The compound of claim 1, where the isocyanate-reactive compound (b) is selected from formulas (IIa), (IIb), or (IIc):

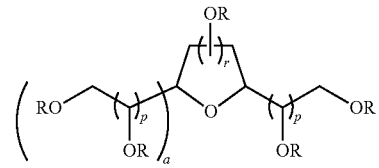

(IIa)

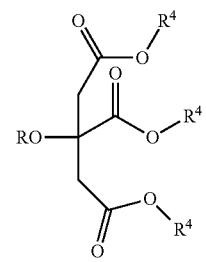

(IIb)

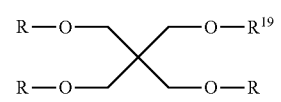

(IIc)

wherein each R is independently —H; —$R^1$; —C(O)$R^1$; —(CH$_2$CH$_2$O)$_n$(CH(CH$_3$)CH$_2$O)$_m$$R^2$; or —(CH$_2$CH$_2$O)$_n$(CH(CH$_3$)CH$_2$O)$_m$C(O)$R^1$;

each n is independently 0 to 20;
each m is independently 0 to 20;
m+n is greater than 0;
r is 1 to 3;
a is 0 or 1;
p is independently 0 to 2;
provided that a is 0 when r is 3;
each $R^1$ is independently a linear or branched alkyl group having 5 to 29 carbons optionally comprising at least 1 unsaturated bond;
each $R^2$ is independently —H, or a linear or branched alkyl group having 6 to 30 carbons optionally comprising at least 1 unsaturated bond;
or a mixtures thereof,
provided when formula (IIa) is chosen, then at least one R is —H and at least one R is a —$R^1$; —C(O)$R^1$; —(CH$_2$CH$_2$O)$_n$(CH(CH$_3$)CH$_2$O)$_m$$R^2$;
or —(CH$_2$CH$_2$O)$_n$(CH(CH$_3$)CH$_2$O)$_m$C(O)$R^1$;
each $R^4$ is independently —H, a linear or branched alkyl group having 6 to 30 carbons optionally comprising at least 1 unsaturated bond, or combinations thereof;
—(CH$_2$CH$_2$O)$_n$(CH(CH$_3$)CH$_2$O)$_m$$R^2$; or
—(CH$_2$CH$_2$O)$_n$(CH(CH$_3$)CH$_2$O)$_m$C(O)$R^1$;
provided when formula (IIb) is chosen, then at least one R or $R^4$ is —H; and at least one R or $R^4$ is a linear or branched alkyl group optionally comprising at least 1 unsaturated bond, or combinations thereof;
—(CH$_2$CH$_2$O)$_n$(CH(CH$_3$)CH$_2$O)$_m$$R^2$; or
—(CH$_2$CH$_2$O)$_n$(CH(CH$_3$)CH$_2$O)$_m$C(O)$R^1$; and
each $R^{19}$ is —H, —C(O)$R^1$, or —CH$_2$C[CH$_2$OR]$_3$,
provided when formula (IIc) is chosen, then at least one $R^{19}$ or R is —H; and
at least one $R^{19}$ or R is —C(O)$R^1$, —(CH$_2$CH$_2$O)$_n$(CH(CH$_3$)CH$_2$O)$_m$$R^2$; or
—(CH$_2$CH$_2$O)$_n$(CH(CH$_3$)CH$_2$O)$_m$C(O)$R^1$.

3. The compound of claim 2 wherein the isocyanate-reactive compound (b) is selected from formula (IIa) to be formula (IIa'):

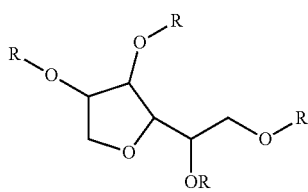

(IIa')

wherein R is further limited to independently —H; —$R^1$; or —C(O)$R^1$.

4. The compound of claim 2 wherein the isocyanate-reactive compound (b) is selected from formula (IIa) to be formula (IIa'):

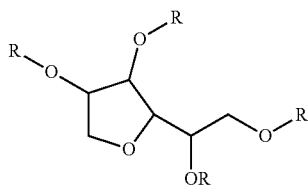

(IIa')

wherein R is further limited to independently —H; —(CH$_2$CH$_2$O)$_n$(CH(CH$_3$)CH$_2$O)$_m$$R^2$; or
—(CH$_2$CH$_2$O)$_n$(CH(CH$_3$)CH$_2$O)$_m$C(O)$R^1$.

5. The compound of claim 1, where the isocyanate-reactive compound (b) is a fluorinated alcohol having formula (I)

$$R_f\text{-A-OH} \quad (I),$$

where $R_f$ is a $C_1$ to $C_{20}$ fluoroalkyl group optionally interrupted by CH$_2$, CH$_2$CH$_2$, SO$_2$N, CFH, S, or O; and A is a direct bond or a $C_1$ to $C_6$ alkylene group.

6. The compound of claim 1, where the bisulfate source (d) is a metabisulfite salt, a bisulfite salt, or a mixture of SO$_2$ and base.

7. The compound of claim 1, wherein the diisocyanate or polyisocyanate is selected from formulas (IIIa), (IIIb), (IIIc), (IIId), and (IIIe):

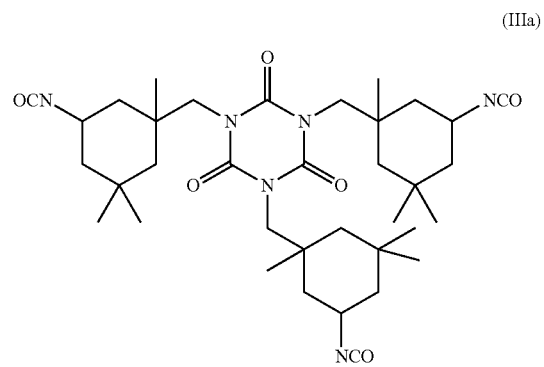

(IIIa)

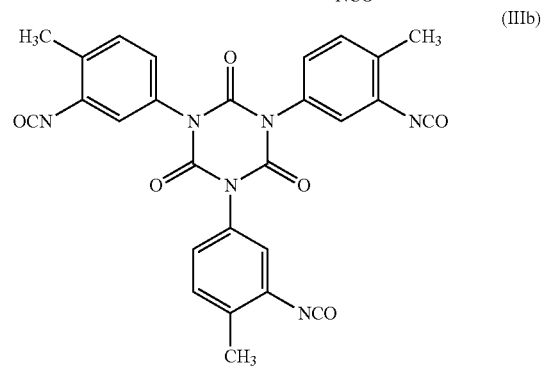

(IIIb)

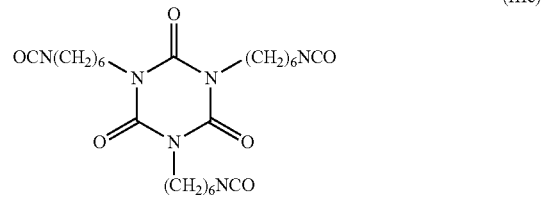

(IIIc)

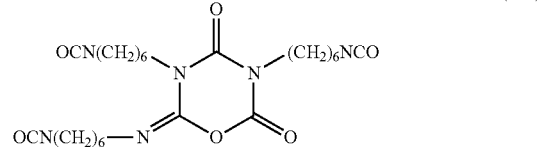

(IIId)

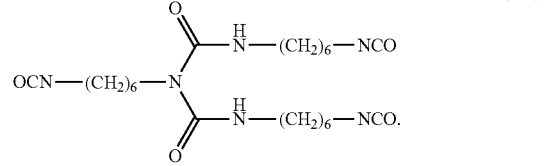

(IIIe)

8. The compound of claim 1, wherein the reagents further comprise at least one additional isocyanate-reactive compound (e) selected from water, organic compounds of formula (IVa)

$$R^5\text{-}D \quad (IVa),$$

or organic compounds of formula (IVb)

$$R^3\text{—}(OCH_2CH(OR^3)CH_2)z\text{-}OR^3 \quad (IVb),$$

or mixtures thereof, wherein $R^5$ is selected from a —$C_1$ to $C_{30}$ linear or branched alkyl optionally comprising at least one unsaturated group, a hydroxy-functional $C_1$ to $C_{30}$ linear or branched alkyl, a hydroxy-functional linear or branched $C_1$ to $C_{30}$ polyether, a hydroxy-functional linear or branched polyester having a polyester polymer backbone, a hydroxy-functional linear or branched organosiloxane, an amine-functional linear or branched organosiloxane, a thiol-functional $C_1$ to $C_{30}$ linear or branched alkyl, an amine-functional $C_1$ to $C_{30}$ linear or branched alkyl,

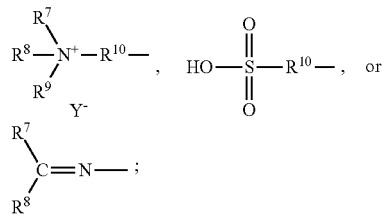

D is selected from —$N(R^{12})H$, —OH, —COOH, —SH, —O—$(CH_2CH_2O)_s(CH(CH_3CH_2O)_t$—H, or $(C(O)$—O—$(CH_2CH_2O)_s(CH(CH_3)CH_2O)_t$H;

$R^3$ is independently selected from —H; —$R^{18}$; or —C(O)$R^{18}$, provided that at least one $R^3$ is —H;

$R^{12}$ is —H or a monovalent $C_1$ to $C_6$ alkyl group;

$R^7$, $R^8$, and $R^9$ are each independently, —H, to $C_6$ alkyl, or combinations thereof;

$R^{10}$ is a divalent alkyl group of 1 to 20 carbons;

$R^{18}$ is independently a linear or branched alkyl group having 5 to 29 carbons optionally comprising at least 1 unsaturated bond;

z is 1 to 15;

Y is Cl;

s is an integer of 0 to 50;

t is an integer of 0 to 50; and s+t is greater than 0.

9. An aqueous composition comprising the compound of claim 1.

10. A method of reducing the surface tension of an aqueous medium comprising contacting the aqueous medium with a compound of claim 1.

11. A coating composition made by the method of claim 10, wherein the aqueous medium is an aqueous coating base.

12. A method of providing a surface effect to a fibrous substrate comprising contacting a fibrous substrate with a compound of claim 1.

13. A fibrous substrate which has been treated by the method of claim 12.

* * * * *